(12) United States Patent
Tandon et al.

(10) Patent No.: US 8,672,759 B2
(45) Date of Patent: Mar. 18, 2014

(54) GAMING PERIPHERAL INCLUDING RELEASABLY ENGAGEABLE RELEASE ELEMENT

(75) Inventors: Vinod V. Tandon, San Diego, CA (US); Gary Zalewski, Oakland, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 1452 days.

(21) Appl. No.: 12/151,426

(22) Filed: May 6, 2008

(65) Prior Publication Data

US 2009/0280902 A1    Nov. 12, 2009

(51) Int. Cl.
*A63F 9/00* (2006.01)

(52) U.S. Cl.
USPC .......................................... 463/37

(58) Field of Classification Search
USPC .......................................... 463/51
See application file for complete search history.

(56) References Cited

U.S. PATENT DOCUMENTS

| | | | | |
|---|---|---|---|---|
| 4,461,475 A * | 7/1984 | Nakamura | ......................... | 463/7 |
| 4,627,620 A * | 12/1986 | Yang | ......................... | 273/446 |
| 4,893,815 A * | 1/1990 | Rowan | ......................... | 463/47.3 |
| 5,039,094 A * | 8/1991 | Kobayashi et al. | ......................... | 273/446 |
| 5,542,672 A * | 8/1996 | Meredith | ......................... | 463/37 |
| 5,569,085 A * | 10/1996 | Igarashi et al. | ......................... | 463/49 |
| 5,571,267 A * | 11/1996 | Yokoi et al. | ......................... | 273/446 |
| 5,730,655 A * | 3/1998 | Meredith | ......................... | 463/37 |
| 6,068,484 A * | 5/2000 | O'Loughlin et al. | ......................... | 434/22 |
| 6,315,568 B1 * | 11/2001 | Hull et al. | ......................... | 434/22 |
| 6,328,651 B1 * | 12/2001 | Lebensfeld et al. | ......................... | 463/52 |
| 6,463,859 B1 * | 10/2002 | Ikezawa et al. | ......................... | 104/53 |
| 6,643,968 B2 * | 11/2003 | Glock | ......................... | 42/1.02 |
| 6,672,962 B1 * | 1/2004 | Ozaki et al. | ......................... | 463/37 |
| 6,780,014 B1 * | 8/2004 | Hull et al. | ......................... | 434/22 |
| 6,811,491 B1 * | 11/2004 | Levenberg et al. | ......................... | 463/47 |
| 6,929,543 B1 * | 8/2005 | Ueshima et al. | ......................... | 463/7 |
| 7,662,047 B2 * | 2/2010 | Ueshima et al. | ......................... | 473/199 |
| 2002/0166551 A1 * | 11/2002 | Lee | ......................... | 124/78 |
| 2003/0061753 A1 * | 4/2003 | Glock | ......................... | 42/1.02 |
| 2006/0030383 A1 * | 2/2006 | Rosenberg et al. | ......................... | 463/1 |
| 2006/0183546 A1 * | 8/2006 | Addington et al. | ......................... | 463/37 |
| 2008/0280660 A1 * | 11/2008 | Ueshima et al. | ......................... | 463/3 |
| 2008/0305895 A1 * | 12/2008 | Gant | ......................... | 473/453 |
| 2009/0325699 A1 * | 12/2009 | Delgiannidis | ......................... | 463/32 |

* cited by examiner

*Primary Examiner* — Seng H Lim

(74) *Attorney, Agent, or Firm* — Lerner, David, Littenberg, Krumholz & Mentlik, LLP

(57) ABSTRACT

A gaming peripheral for use during play of an electronic video game includes a releasably engageable release element which disengages in accordance with game play. Disengagement of the release element is selectably controllable and based on receipt of an electronic trigger signal transmitted from a gaming console on which the game is being played. The release element is engaged by a player applying a manual force to the peripheral.

10 Claims, 7 Drawing Sheets

GAMING PERIPHERAL INCLUDING RELEASABLY ENGAGEABLE RELEASE ELEMENT

BACKGROUND OF THE INVENTION

Some peripherals for gaming software include motion sensing devices that transmit, to a gaming console, information representative of movement, and direction of the movement, of the peripheral. For example, a peripheral may be used to simulate a bat in a video game, wherein the ball is hit by using the peripheral to mimic the movement of a bat at the right moment. Some peripherals include feedback force devices, such as a piezoelectric element, that are used to vibrate the peripheral at particular moments to increase the simulation experience.

The goal for many gaming peripherals is to be small and light enough to be easily held in the hand. Many peripherals are also wireless, which places a greater emphasis on minimizing power consumption because of the limited battery power. Accordingly, these size, weight and power constraints limit the types of motors, piezoelectric or similar kinetic elements that can be used to provide feedback elements to the user.

Therefore, there exists a need for a gaming peripheral which simulates actual physical events with more realistic force and motion, while maintaining the peripheral in a form pleasing to a player.

SUMMARY OF THE INVENTION

In accordance with an aspect of the present invention, a gaming peripheral for use during play of an electronic video game includes a base and a release element releasably engageable to the base, and where the release element disengages from the base in accordance with game play. The release element at least partially disengages from the base, based on an electronic release signal the peripheral receives from a gaming console on which the game is being played. The release element preferably disengages from the base to simulate a physical event occurring during game play.

In one embodiment, the release element is coupled to the base by a resilient element, such as a compressible spring, and an application of force to the peripheral is required for engaging the release element with the base. In a further embodiment, a manual force provided by a user of the peripheral is required for engaging the release element with the base. In still a further embodiment, the peripheral includes an electronically powered device, such as a motor, operable for engaging the release element with the base.

In another embodiment, the release element is selectively disengageable from the base. In a preferred embodiment, the release element is at least partially disengageable from the base. In a further embodiment, each of the direction of the movement of the release element, and the amount of force acting upon the release element, when the release element disengages from the base is controllable.

DETAILED DESCRIPTION

Figure 1:
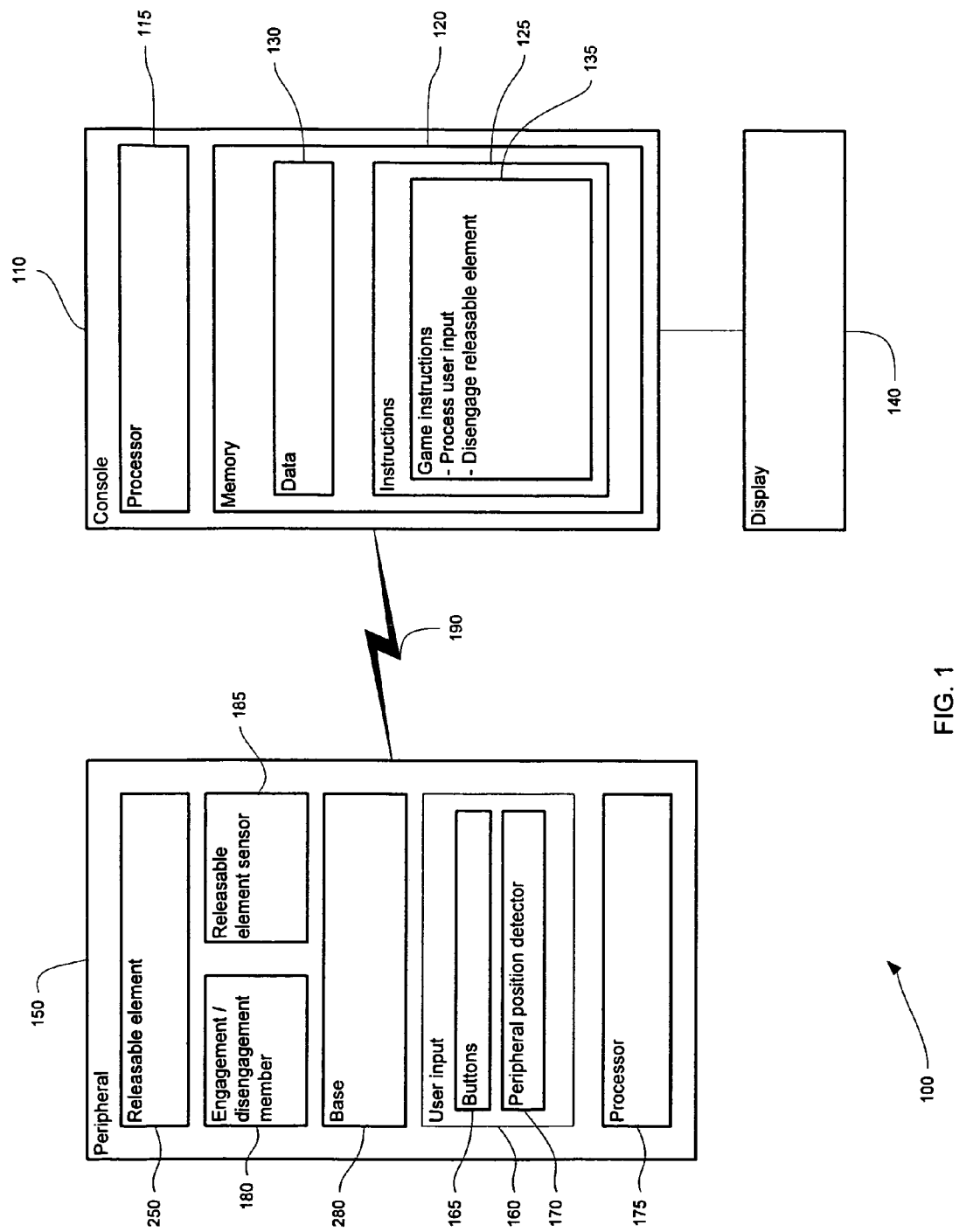
FIG. 1 is a system diagram in accordance with an aspect of the present invention.

As shown in FIG. 1, a system 100 in accordance with one aspect of the invention comprises a game console 110, display 140, peripheral 150 and other components typically present in game consoles. The system is used by a user.

Game console 110 preferably includes a processor 115 and memory 120. Memory 120 stores information accessible by processor 130, including instructions 125 for execution by the processor 115, and data 130 which is retrieved, manipulated or stored by the processor. The memory may be of any type capable of storing information accessible by the processor; by way of example, hard-drives, ROM, RAM, CD-ROM, DVD, write-capable memories, and read-only memories.

The instructions 125 may comprise any set of instructions to be executed directly (e.g., machine code) or indirectly (e.g., scripts) by the processor. The terms "instructions," "steps" and "programs" may be used interchangeably herein. The functions, methods and routines of the program in accordance with the present invention are explained in more detail below.

Data 130 may be retrieved, stored or modified by processor 115 in accordance with the instructions 125. The data may be stored in any manner known to those of ordinary skill in the art such as in computer registers, in records contained in tables and relational databases, or in XML files. The data may also be formatted in any computer readable format such as, but not limited to, binary values, ASCII or EBCDIC (Extended Binary-Coded Decimal Interchange Code). Moreover, any information sufficient to identify the relevant data may be stored, such as descriptive text, proprietary codes, pointers, or information which is used by a function to calculate the relevant data.

Although the processor and memory are functionally illustrated in FIG. 1 as within the same block, it will be understood by those of ordinary skill in the art that the processor and memory may actually comprise multiple processors and memories that may or may not be stored within the same physical housing. For example, some of the instructions and data may be stored on a removable DVD, CD-ROM and others within a read-only computer chip. Some or all of the instructions and data may be stored in a location physically remote from, yet still accessible by, the processor. For example, some or all of the instructions may be downloaded or accessed over a network (not shown). Similarly, the processor may actually comprise a collection of processors which may or may not operate in parallel.

All or a portion of the instructions 125 may comprise game instructions 135, which may be a specific to a particular game, such as a baseball or first-person shooter video game.

As noted above, system 100 may comprise additional components typically found in a game console or computer system such as a display 140 (e.g., an LCD screen), microphone, modem (e.g., telephone or cable modem), camera, speakers, and all of the components used for connecting these elements to one another. Accordingly, the console is preferably capable of outputting audio and video signals for rendering by displays and speakers or the like. Game console 110 preferably communicates with the Internet via a modem or some other communication component such as a network card.

The game console may comprise a dedicated gaming system, such as a Sony Playstation. The game console may also comprise any device capable of processing instructions and transmitting data to and from humans and other computers or devices, including general purpose computers, network computers lacking local storage capability, PDA's with modems and Internet-capable wireless phones, digital video recorders, cable television set-top boxes or consumer electronic devices.

Peripheral 150 includes two elements such that one is capable of movement with respect to the other. For example, peripheral 150 may include releasable element 250 and base 280 and a member 180 to engage and/or disengage the releasable element 250. The peripheral may also include a sensor 185 for providing information related to the position of the releasable element relative to the base.

Peripheral 150 also includes user input such as buttons 165, a detector 170 for determining the position and orientation of the peripheral with respect to console 110, or any other device for receiving input from the user such as a joystick, game pad, or touch-sensitive screen. In one aspect, the peripheral includes a processor 175 for controlling or receiving signals from the other elements. It will be understood that the processor 175 may also comprise a controller for relaying, and translating as necessary, signals from the console that are applicable to the other elements.

The peripheral is in communication with the console via a communication link 190, which may be wired or wireless.

Figure 2:
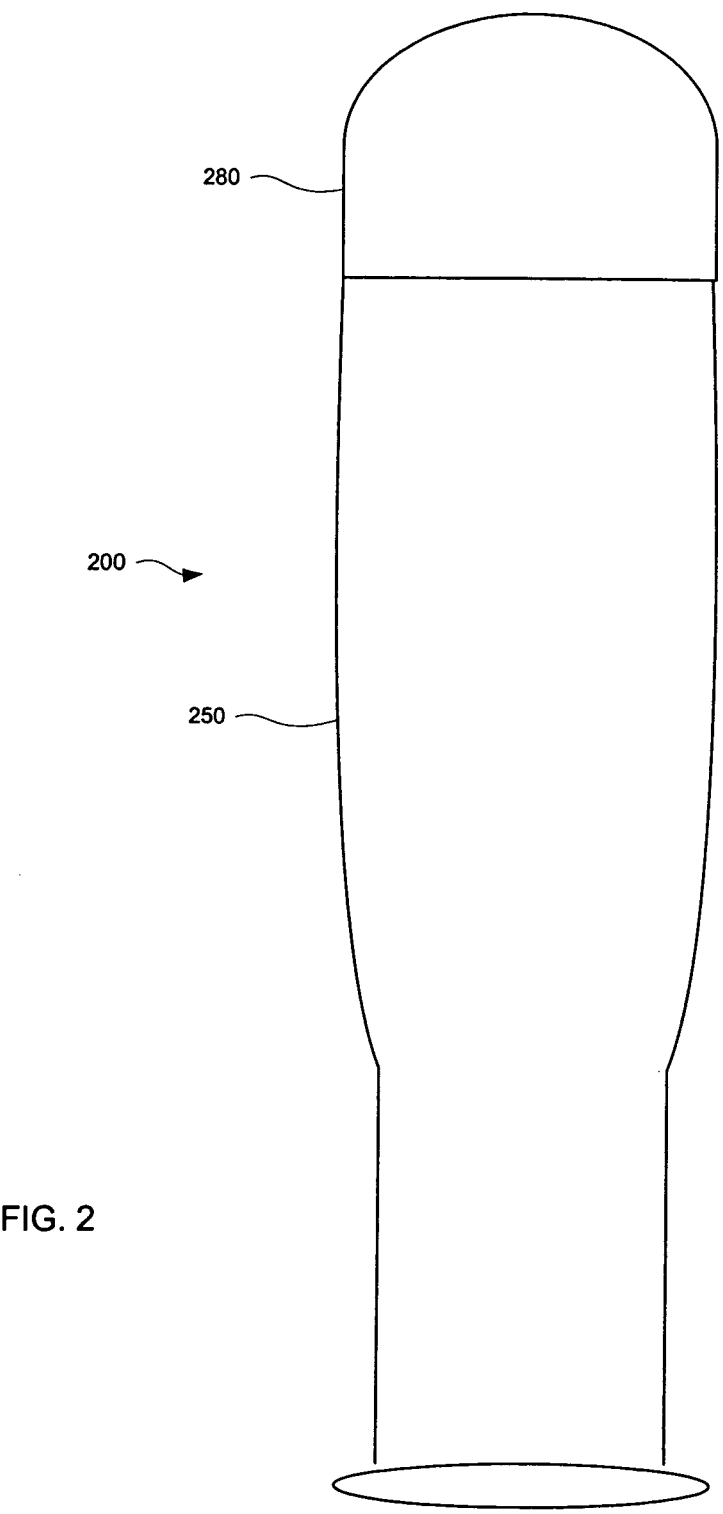
FIG. 2 is a schematic diagram of a baseball-bat shaped peripheral in accordance with an aspect of the present invention.

FIG. 2 illustrates one aspect of a peripheral in accordance with the current invention. The peripheral 200 is in the shape of a baseball bat. It includes a base 250 and top 280, the top 280 being capable of being engaged or disengaged from the base 250.

Figure 3:
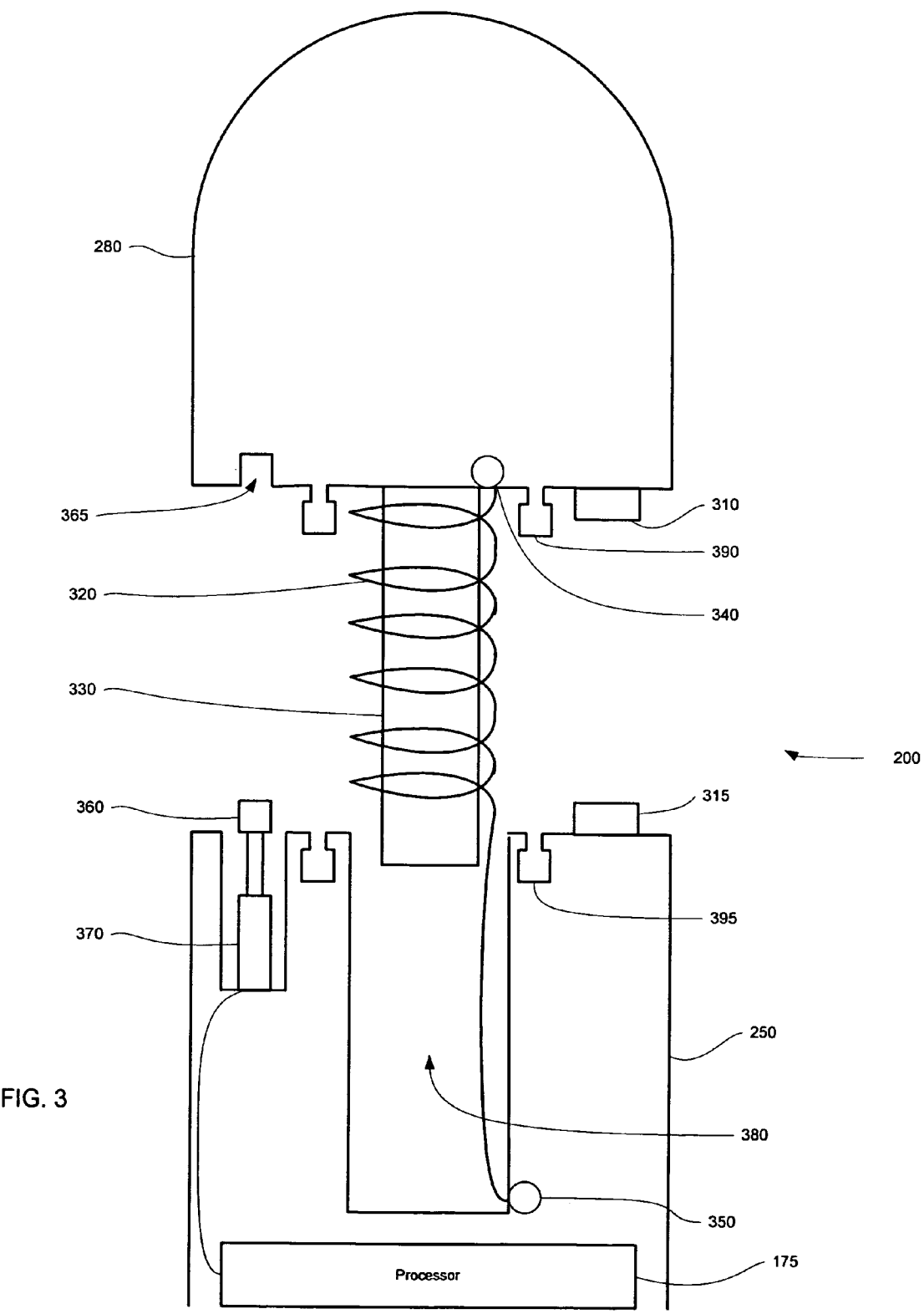
FIG. 3 is a cross-sectional schematic diagram of a peripheral in accordance with an aspect of the present invention.

FIG. 3 illustrates one possible aspect of the baseball bat of FIG. 2 in more detail and cross-section. The top 280 includes a stop 310 and a barrel 330. The base 250 has an aperture 380 for receiving the barrel 330. (The top 280 is shown distanced from the base 250 for the purposes of illustration only. When assembled, the barrel 330 would reside in the aperture 380.)

The base 250 and top 280 are reasonably connected to one another via a tension device, such as a spring, elastic cord, resilient devices, compressible gases or liquids (such as a hydraulics or bladder) and other devices wherein the application of force causes the device to exert a counter-force. For example, a spring is attached to top 280 at connection 340, wraps around the barrel 330, and is connected to the base 250 at connection 350 such that when the top is rotated with respect to the base in one direction, the spring is wound and exerts a force in the opposite direction. In one aspect, spring 320 has a relatively large spring constant k and able to quickly unwind at a great deal of speed.

The moveable element and base may engage one another at various areas. For example, the top and base may be arranged such that a device is able to selectively engage or disengage the top and base to one another. By way of further example, base 280 may include a piezoelectric element 370 which is able to extend component 360 into a hole 265 in top 280, thus preventing the top from rotating with respect to the base. Element 370 may be controlled by processor 175.

The top and base may also include a mechanism for limiting the range of movement of the top to the base. For example, the top 280 may include a flange 390 which resides in the base's groove 395, thus allowing the top 280 to rotate with respect to the base 395, but not otherwise be removed from the base 380. The top and base may also include top stop 310 and base stop 315 respectively. These stops may further limit the range of rotational movement, such that the top may not be wound, or unwind, more than on complete rotation.

Figure 9:
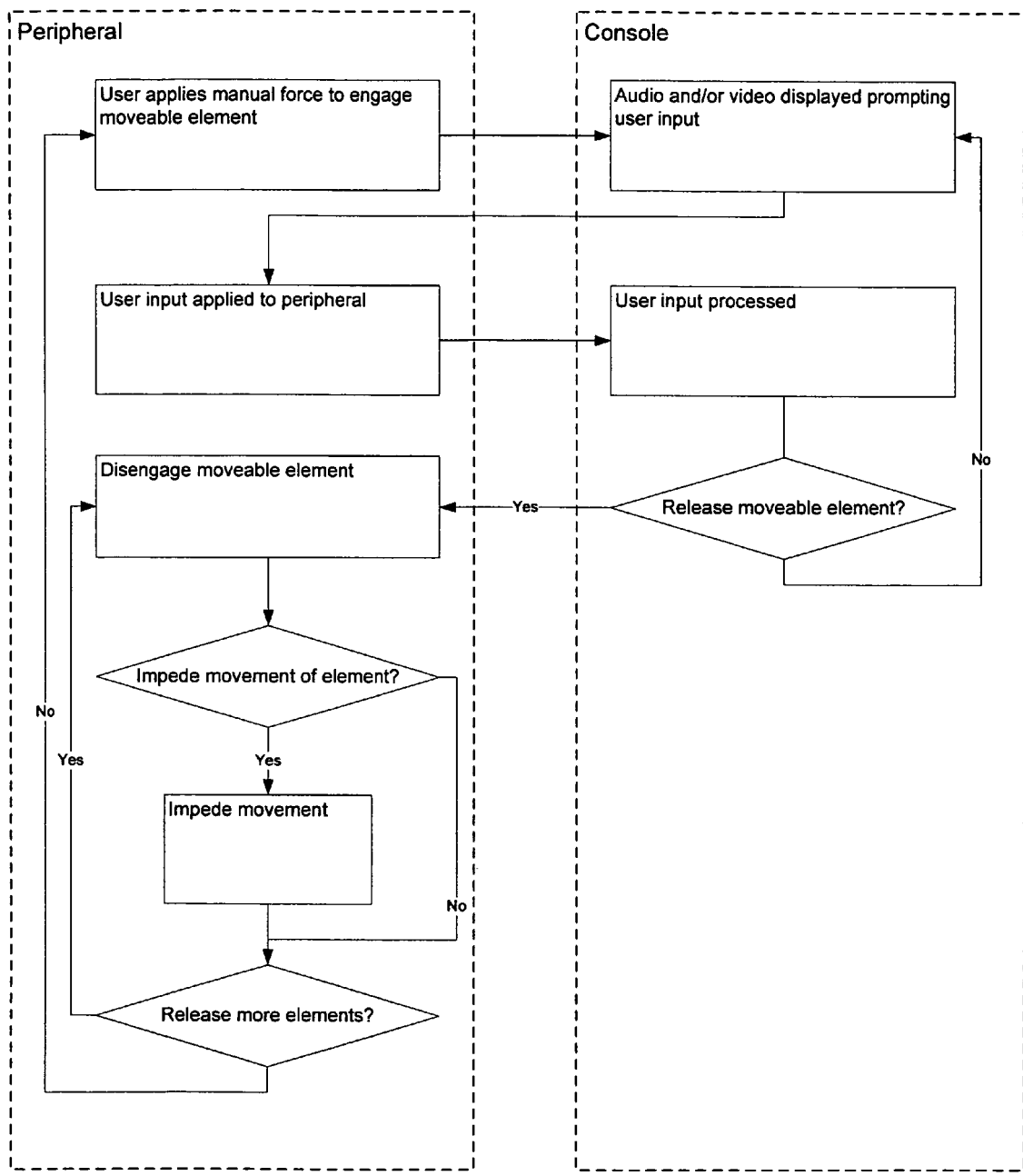
FIG. 9 is a flow chart in accordance with an aspect of the invention.

In addition to the operations illustrated in FIG. 9, an operation in accordance with a variety of aspects of the invention will now be described. It should be understood that the following operations do not have to be performed in the precise order described below. Rather, various steps can be handled in reverse order or simultaneously.

A user manually moves the moveable element relative to the base. For example, the user may rotate top 280 with respect to base 250 so as to tension the spring 320. The user continues to wind the top until the top is engaged to the base, such as until the component 360 of the base is able to—and does—extend into the hole 365 of the top. Accordingly, in this and other aspects of the invention, the user primes the peripheral for further operation by applying manual force.

While playing a game, the game instructions determine whether a release signal should be sent to disengage the moveable element from the base based on the state of the game and the user input signals received from the peripheral. For example, as shown in FIG. 1, instructions 125, including game instructions 135, may display a ball being pitched to a batter—played by the user—on display 140. In response, the user moves the bat 200 and the changing position or orientation is detected by position detector 170. The position is communicated to the console 110 via link 190. If instructions 135 determine that the user's manipulation of the peripheral indicates that the user has hit the ball, a release signal is transmitted to peripheral 150.

As shown in FIG. 3, in response to the release signal from the console, the moveable element is automatically released. For example, in response to receiving the release signal, processor 175 may instruct piezoelectric element 370 to withdraw component stop 360 into the base. As a result, the top is disengaged from the base 250, and unwinds without further manual assistance from the user.

In one aspect, disengaging the moveable element simulates both a sound and motion in the game. By way of example, if spring 320 is such that it unwinds with sufficient speed, stop 310 and 315 will clap together, making a loud audible sound and causing the bat to shudder, thus simulating the sound and feel of a bat when it collides with a ball. The sounds and motion of the peripheral may be synchronized with audio and visual signals from the console, e.g., the ball will be shown as being hit and moving on the screen at the same time the top is moving. The console may also play crowd noise in response to the hit, or enhance the sound emitted by the peripheral with audio of a ball being hit.

The foregoing process may be repeated. For example, the user may wind the top for the next pitch and, if the ball is hit, the moveable top will be disengaged.

Figure 4:
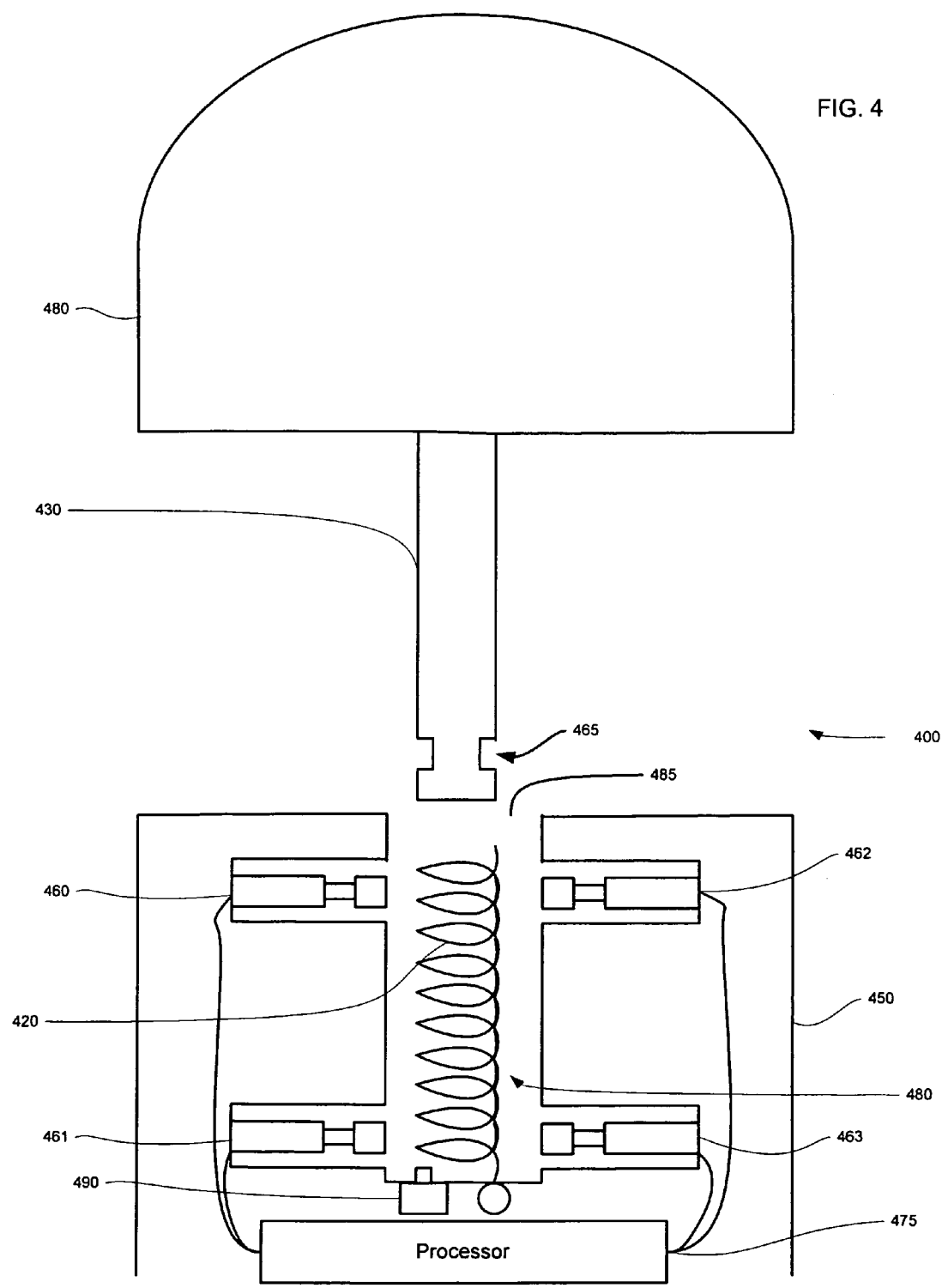
FIG. 4 is a cross-sectional schematic diagram of a peripheral in accordance with an aspect of the present invention.

FIG. 4 illustrates another peripheral in accordance with an aspect of the invention, wherein the top may be completely disengaged from the base and its direction of movement selectably controlled. By way of example and similar to the bat shown in FIG. 3, peripheral 400 simulates a baseball bat and includes a moveable top 480 with a barrel 430 extending into an aperture 485 within base 450. It also includes a plurality of elements 460-463 (such as piezoelectric element) that can move relative to the base and the moveable element 480, and may engage holes or groove 465 on disposed on the barrel. The base may also include switch 490, which signals to processor 475 that the top is completely inserted into the base whenever the switch is depressed. The spring 420 is attached to the base 450, but not the top 480.

In one method of operation, the user engages the moveable top 480 to the base by inserting the barrel 430 into the base's aperture 485. The user may place the top of the bat on the floor and lean on the bottom of bat, compressing spring 420 until elements 461 and 463 on the base engage groove 465. Processor 475 may instruct elements 461, 463 to engage the holes in response to receiving a signal from switch 490 that the top is completely inserted into the base.

Figure 5:
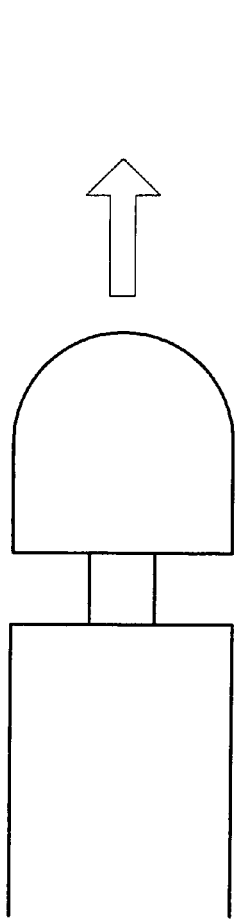
FIG. 5 indicates the motion of a moveable element in accordance with an aspect of the present invention.

When a release signal is received by the peripheral, the moveable member may be allowed to move a portion of its full range of movement rather than the entire range. For example, in response to a "partial" release signal, elements 461, 463 will disengage from the groove 465, the spring will decompress, and the top will be forced out of the base. However, the processor 475, in response to a partial release signal from the console, may also cause elements 460, 462 to engage the barrel 430 as soon as elements 461, 463 disengage from the barrel. Accordingly, the elements 460, 462 will move their components into groove 465 as soon as the groove moves opposite the elements, thus causing the top to stop shortly after it leaves the base. A partial release signal may be associated with a foul ball, wherein the user input signals from the peripheral indicate that the virtual position of the ball indicate that the user hit the ball, but not accurately. FIG. 5 illustrates a top 480 that has partially disengaged from the base after being released.

Figure 6:
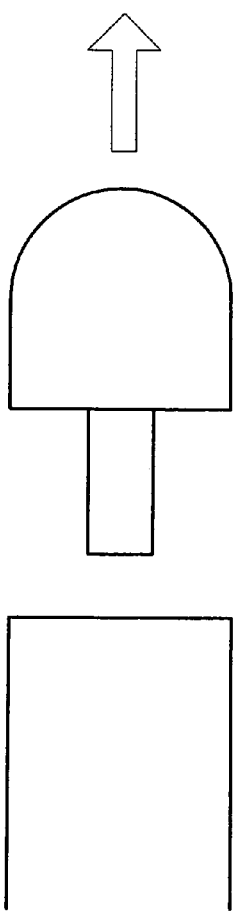
FIG. 6 indicates the motion of a moveable element in accordance with an aspect of the present invention.

A different release signal from the base may indicate that the moveable element should be allowed its full range of movement. For example, in response to a "complete" release signal, the processor 475 may cause all of the elements 460-463 to disengage, thus allowing the top to fly out of the barrel. Preferably, in such an embodiment, the top of the bat is made of a soft material. A complete release signal may be associated with a fair ball, and is illustrated in FIG. 6.

Figure 7:
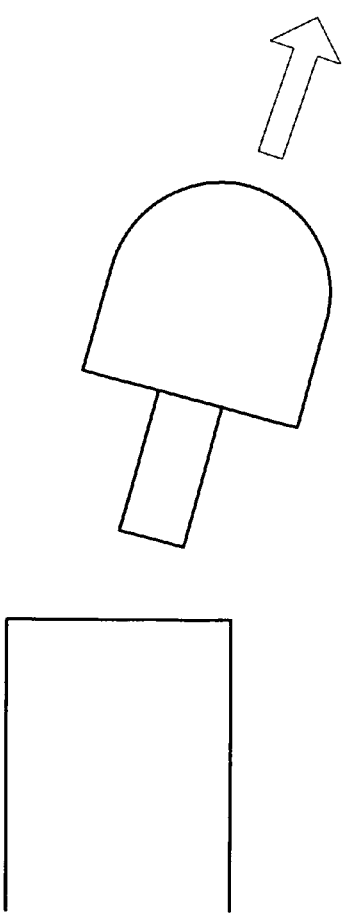
FIG. 7 indicates the motion of a moveable element in accordance with an aspect of the present invention.

Yet another aspect of the invention controls the direction of the moveable element. For example, if an "angle" release signal is received by the peripheral, some the moveable member may be allowed to move a portion of its full range of movement rather than the entire range. For example, in response to the angle release signal, elements 461, 463 will disengage from the groove 465, the spring will decompress, and the top will be forced out of the base. However, the processor 475, in response to an angle release signal from the console, may also cause one of the elements 460 or 462 to momentarily engage the barrel 430 after the top is released but before the groove 465 is opposite element 460 or 462. By pushing the barrel 430 in one direction as it is leaving the aperture 485, the direction of the top may be controlled as shown in FIG. 7. Preferably, in such an aspect, the width of aperture 485 of the base will be greater than the width of the barrel 430. It will be understood that different and additional control elements may be added to finely control the distance and direction of the moveable element.

Figure 8:
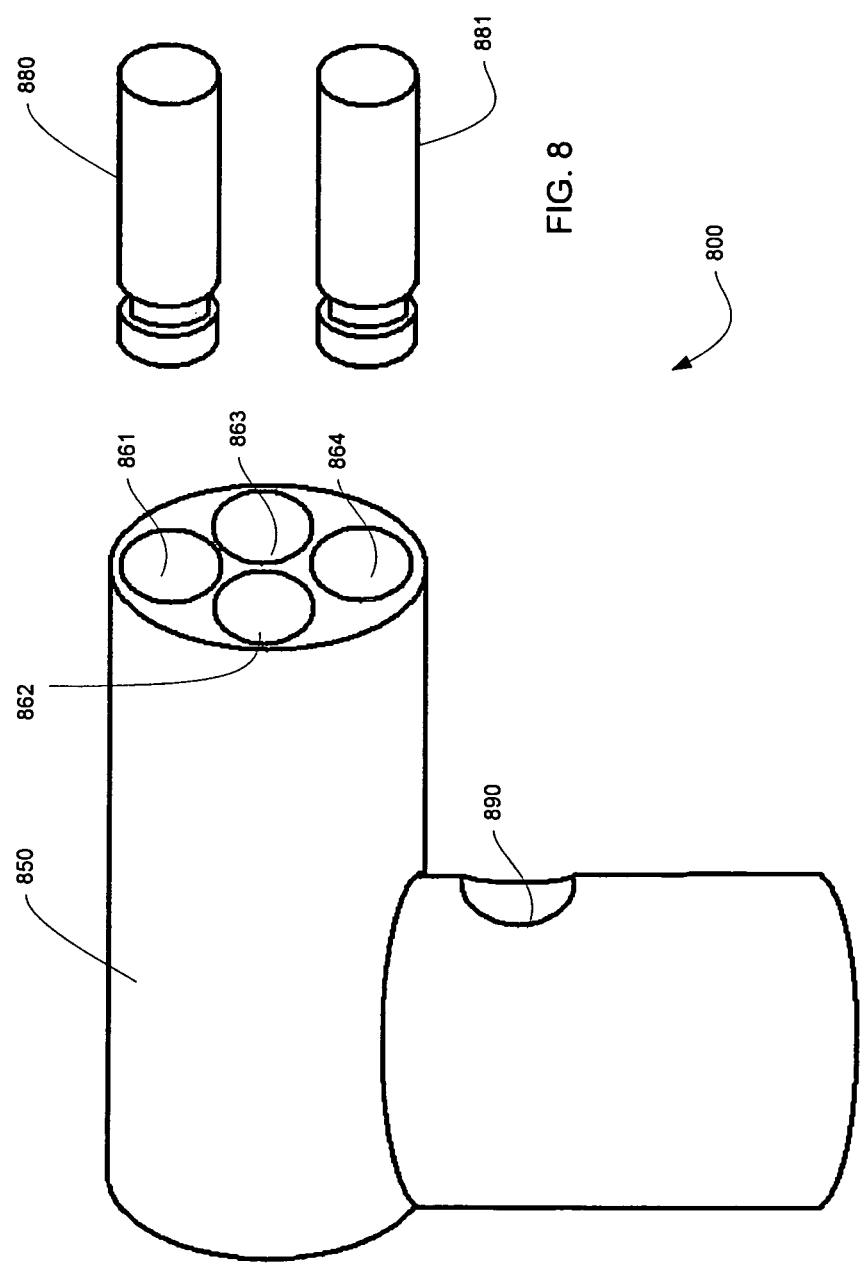
FIG. 8 is a diagram of a gun-shaped peripheral in accordance with an aspect of the present invention.

Another aspect of the invention provides for multiple moveable elements. FIG. 8 shows an example of such an aspect in the context of gun-shaped peripheral 800. There are multiple apertures 861-864 for holding and releasing multiple moveable elements, such as bullet shaped elements 880, 881. Each of the elements may be individually and selectively-released in response to instructions from the console. For example, all of the moveable elements may be released at once, one at a time, or in timed patterns or combinations depending on the user's manipulation of the user-input trigger 890 relative to game characters being displayed by the console.

One of the advantages of the present invention is its ability to accommodate a wide variety of alternatives to the example structural elements and operations discussed above. For example, in some aspects, a motor could be added to the peripheral to return the moveable element into engagement with the base, though such an addition may, in many circumstances, be less advantageous because the power and size constraints of the motor may not be able to match the force that may be applied by a person. The motor may also be used to impede or control the motion of the moveable element, such as by slowing the ejection of the top of the bat.

In another aspect of the invention, the tension in the spring or other tension device is not created by attaching the moveable part to the base. Rather, the spring may be compressed or elongated by the user-operated by operating a crank, level or other mechanism to create the tension, and the moveable part attached before or afterwards.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of providing feedback via a peripheral, the method comprising:
   manually moving a moveable part of a peripheral so as to engage the moveable part to a base of the peripheral, thereby creating tension between the part and the base, wherein the peripheral is in communication with a game console rendering a game;
   activating a user input on the peripheral in response to information provided by the game console;
   receiving a signal from the console to release the moveable part, wherein the signal is based on the state of the game and the activated user input; and
   automatically releasing the part in response to the signal from the console.

2. The method of claim 1 further wherein the part is partially released from the base.

3. The method of claim 1 wherein the direction in which the part is released depends on the signal received from the console.

4. The method of claim 1 wherein the part represents an image displayed on a screen in communication with the game console, and the movement of the part corresponds with the movement of the image.

5. The method of claim 4 wherein the game is a baseball game.

6. A method for playing a video game comprising:
   providing a gaming peripheral including a releasably engageable release element, wherein the gaming peripheral is in communication with a game console rendering an electronic video game;
   activating a user input on the gaming peripheral in response to information provided by the game console;
   generating an electronic trigger signal to release the releasably engageable release element based on the activated user input; and
   disengaging the release element based on receipt of the electronic trigger signal at the peripheral and in accordance with play of the electronic video game being rendered by the game console.

7. The method of claim 6, wherein the disengaging further comprises setting the peripheral to a partially disengaged position.

8. The method of claim 6, wherein the disengaging further comprises selectively controlling at least one of direction, extent and speed of movement of the release element.

9. The method of claim 6 further comprising:
   a player of the game applying a manual force to the peripheral for setting the peripheral to a fully engaged position.

10. A method of releasing a moveable part from a gaming peripheral, wherein the part was attached to the peripheral by a user and the attachment introduces tension between the part and the peripheral, comprising:
   displaying a game to a user in accordance with instructions, the game being rendered by a game console;
   receiving user input on the peripheral;
   determining whether the moveable part should be released from the peripheral based on the instructions and the received user input; and
   providing a signal to the peripheral to release the part.

* * * * *